Aug. 14, 1962     M. R. BEATTY     3,048,869
SWEEPER BRUSH ATTACHMENT FOR ROTARY MOWERS
Filed Feb. 24, 1961
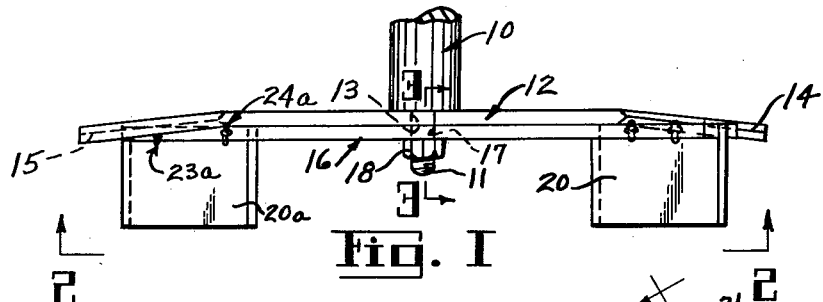
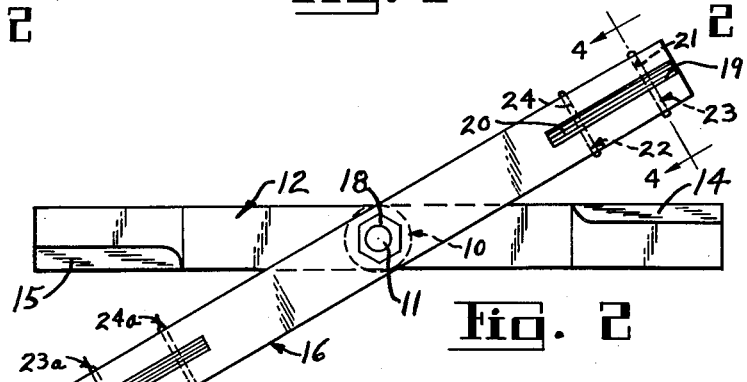
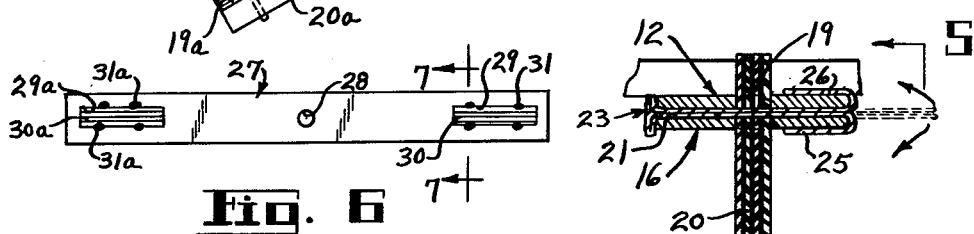
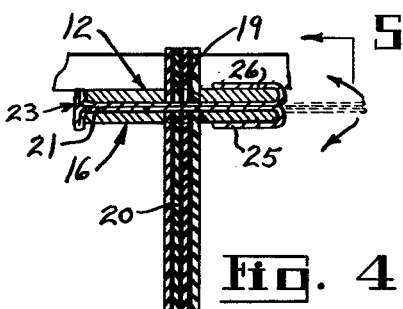
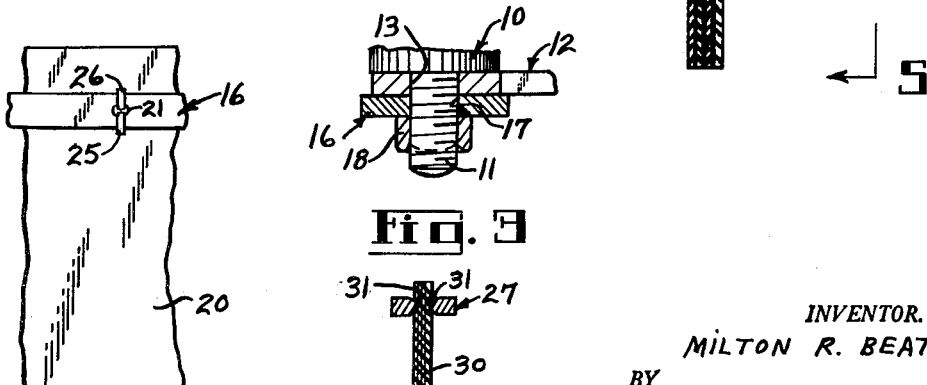
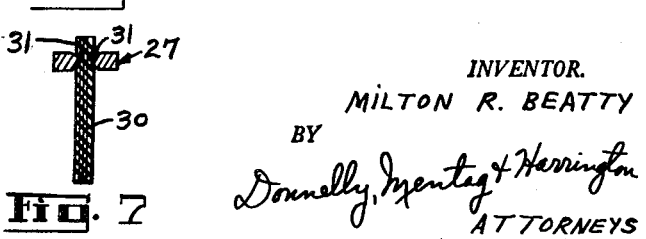
INVENTOR.
MILTON R. BEATTY
BY
Donnelly, Mentag & Harrington
ATTORNEYS ര
United States Patent Office 3,048,869
Patented Aug. 14, 1962

3,048,869
SWEEPER BRUSH ATTACHMENT FOR
ROTARY MOWERS
Milton R. Beatty, Detroit, Mich., assignor to David G.
Carty and Steve J. Ternyak, Wayne County, Mich.
Filed Feb. 24, 1961, Ser. No. 91,418
3 Claims. (Cl. 15—79)

This invention relates to the rotary type lawn mower art and more particularly to a novel and improved sweeper brush attachment for mowers of the rotary type.

Conventional rotary lawn mowers are provided with a horizontally disposed rotatable blade and it is the primary object of the present invention to provide a sweeper attachment for a rotary mower which may be mounted on the mower without removing the lawn cutting blade.

It is another object of the present invention to provide a sweeper brush attachment for rotary lawn mowers which can be mounted on any rotary type power mower regardless of the lawn cutter blade length or width.

It is a further object of the present invention to provide a sweeper brush attachment which may be mounted on a rotary lawn mower in a minimum of time and without the need of complicated tools for carrying out the mounting of the sweeper brush on the mower.

It is still another object of the present invention to provide a sweeper brush attachment for a rotary lawn mower which is simple and compact in construction, economical of manufacture, efficient in operation and which can be used to brush snow from sidewalks or leaves and cut grass from a lawn.

Other objects, features and advantages of this invention will be apparent from the following detailed description and appended claims, reference being had to the accompanying drawing forming a part of the specification wherein like reference numerals designate corresponding parts of the several views.

In the drawing:

FIG. 1 is an elevational view of the lower end of the drive shaft of a rotary lawn mower showing a sweeper brush attachment of the present invention mounted on the mower below the conventional lawn cutting blade;

FIG. 2 is a bottom plan view of the structure illustrated in FIG. 1, taken along the line 2—2 thereof and looking in the direction of the arrow;

FIG. 3 is a fragmentary enlarged elevational sectional view of structure illustrated in FIG. 1, taken along the lines 3—3 thereof, and looking in the direction of the arrows;

FIG. 4 is an enlarged elevational sectional view of the structure illustrated in FIG. 2, taken along the line 4—4 thereof, looking in the direction of the arrows, with parts removed, and showing the structure top side up as in FIG. 1;

FIG. 5 is a fragmentary elevational side view of the structure illustrated in FIG. 4, taken along the line 5—5 thereof and looking in the direction of the arrows;

FIG. 6 is a top plan view of a modified specie of the invention showing a modified method for holding the brushes on the brush arm; and, FIG. 7 is an elevational sectional view of the structure shown in FIG. 6, taken along the line 7—7 thereof, and looking in the direction of the arrows.

Referring now to the drawing, the numeral 10 generally designates the usual vertically disposed drive shaft of the conventional rotary type lawn mower. The mower shaft 10 is provided with the downwardly extended reduced threaded portion 11 which is adapted to pass through the centrally disposed hole 13 of the usual elongated lawn cutter blade 12. The blade 12 is adapted to be seated against the lower end of the enlarged shaft 10 and to be normally held in place by means of a lock nut indicated by the numeral 18.

The sweeper brush attachment of the present invention is generally indicated by the numeral 16 and this attachment comprises an elongated bar which is rectangular in longitudinal and transverse cross-section. This attachment bar may also be termed the body of the sweeper brush attachment and it may be made from any suitable light weight material, as for example, aluminum or cold rolled steel. The bar is provided with a centrally disposed hole 17 by means of which it is mounted on the shaft reduced extension portion 11 beneath the cutter blade 12.

As shown in FIGS. 1 and 2, the outer ends of the cutter blade 12 are provided with the usual cutting edges 14 and 15 which are normally bent downwardly a slight amount. It will be seen that the attachment 16 may be quickly and easily mounted on the reduced shaft portion 16 by removing the nut 18 and mounting the attachment bar beneath the cutter blade 12. The sweeper attachment bar will be prevented from rotating to a position completely in alignment with the cutter blade 12 because of the downwardly bent ends of the cutter blade.

As shown in FIGS. 2, 4 and 5, a sweeper brush is operatively mounted on each end of the attachment bar 16 in the following described manner. Since the sweeper brush structure on each end of the attachment bar 16 is constructed the same, only one sweeper brush structure will be described and the other will be marked with similar reference numerals followed by the small letter "a."

As shown in FIG. 2, the right end of the attachment bar is provided with a centrally disposed slot formed completely therethrough and which extends inwardly from the end thereof and this slot is indicated by the number 19. The sweeper means, or sweeper brush 20 is slidably mounted in the slot 19 and this member is preferably made from any suitable rubber material as for example, conveyor belt rubber material or the like. These brushes may be made to any suitable size, for example, it may be approximately four inches in length, four inches in hieght and ¼ inch in thickness. The sweeper brush member 20 may be secured to the attachment bar 16 as by any suitable means, as by means of the cotter keys generally indicated by numerals 22 and 23. These cotter keys are adapted to pass through the transverse holes 21 and 24, and through corresponding holes in the sweeper brush member 20. As shown in FIG. 4, the cotter keys are mounted through the attachment bar and the sweeper brush member 20 and the ends thereof are then bent over and folded back onto the attachment bar, as indicated by numerals 25 and 26. The sweeper brush member on the other end of the attachment bar is indicated by the numeral 20a.

It will be seen that the sweeper brush attachment 16 may be quickly and easily mounted on the reduced lower end 11 of the shaft 10 beneath the usual lawn mower cutter blade 12. When the shaft 10 is rotated, the sweeper brush members 20 and 20a will sweep the snow which lies in the path of these members. The sweeper brush members 20 and 20a will also act secondarily as a revolving fan and will cause a strong air pressure inside of the casing of the rotary lawn mower whereby the snow will be blown away and out through the normal opening in the mower casing through which the mower normally throws the cut grass. It has been found that it is best to mount the sweeper brush attachment 16 on the mower in conjunction with the usual grass cutter blade 12 because the blade 12 assists in breaking up the snow to permit easy evacuation of the same from the mower casing. The height of the sweeper brush members 20 and 20a may be adjusted relative to the ground level by the normal control means in the mower for adjusting the cutter blade upwardly and downwardly.

It will be understood that a lawn mower provided with the sweeper brush attachment 16, may also be used for brushing leaves, and cut grass from a lawn. It has been found that the sweeping brush attachment of the present invention will sweep away snow which has been packed down by cars or pedestrians. The sweeper brush attachment 16 is adapted to be adjusted whereby the sweeper brush members 20 and 23a are in light engagement with the ground surface.

FIGS. 6 and 7 show a modified embodiment of the invention. In the embodiment of FIG. 6, the sweeper attachment comprises the elongated bar 27 having the central hole 28 for mounting the same on the mower drive shaft. In this embodiment, the sweeper brush member is indicated by numeral 30 and it is adapted to be press fitted into the elongated longitudinally disposed slot 29 formed on each end of the bar 27. In this embodiment, the attachment bar 27 may be made out of cold rolled steel. The sweeper brush members 30 are secured in the slots 29 by crimping the steel on each side of the sweeper brush member as indicated by the numerals 31. The sweeper brush member on the other end of the bar 27 is indicated by the numeral 30a and the slot in which it is seated is indicated by the numeral 29a and the crimp points indicated by the numeral 31a. It will be noted that the slot 29 in this case does not extend to the end of the bar 27. The sweeper brush members 30 are made out of the same material as the first embodiment, and this embodiment operates in the same manner as the first embodiment.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In combination with a rotary lawn mower having a vertically disposed cutter blade drive shaft, a sweeper brush attachment comprising: an elongated bar having a centrally disposed, longitudinally extended slot formed in each end thereof; said bar being provided with a centrally disposed hole for mounting the bar on the cutter blade drive shaft; a vertically disposed sweeper brush member fixedly mounted in each of said slots; and sweeper brush members being formed from a resilient continuous surfaced material and extended downwardly from said bar.

2. The structure as defined in claim 1, wherein said sweeper brush members are fixed to the bar by means of attachment means passing transversely through said sweeper brush members and the bar.

3. The structure as defined in claim 1, wherein said sweeper brush members are fixed to the bar by crimping them to the bar.

References Cited in the file of this patent

UNITED STATES PATENTS

| | | |
|---|---|---|
| 929,109 | Rappelee | July 27, 1909 |
| 2,863,162 | Draughon | Dec. 9, 1958 |
| 2,983,057 | Erickson | May 9, 1961 |
| 2,984,919 | Stoddard | May 23, 1961 |